(12) United States Patent
Zhang et al.

(10) Patent No.: US 10,128,650 B2
(45) Date of Patent: Nov. 13, 2018

(54) RELAY PROTECTION METHOD AND APPARATUS AGAINST LC PARALLEL CIRCUIT DETUNING FAULTS

(71) Applicants: NR ELECTRIC CO., LTD., Nanjing, Jiangsu (CN); NR ELECTRIC ENGINEERING CO., LTD., Nanjing, Jiangsu (CN)

(72) Inventors: Qixue Zhang, Jiangsu (CN); Baoli Xu, Jiangsu (CN); Jie Zhang, Jiangsu (CN); Huazhong Li, Jiangsu (CN); Yaoyao Ji, Jiangsu (CN); Shouping Zhong, Jiangsu (CN); Guang Wang, Jiangsu (CN); Jun Chen, Jiangsu (CN); Wei Yan, Jiangsu (CN)

(73) Assignees: NR ELECTRIC CO., LTD., Nanjing, Jiangsu (CN); NR ELECTRIC ENGINEERING CO., LTD., Nanjing, Jiangsu (CN)

( * ) Notice: Subject to any disclaimer, the term of this patent is extended or adjusted under 35 U.S.C. 154(b) by 288 days.

(21) Appl. No.: 15/305,183

(22) PCT Filed: Jan. 8, 2015

(86) PCT No.: PCT/CN2015/070315
§ 371 (c)(1),
(2) Date: Oct. 19, 2016

(87) PCT Pub. No.: WO2015/165286
PCT Pub. Date: Nov. 5, 2015

(65) Prior Publication Data
US 2017/0047729 A1    Feb. 16, 2017

(30) Foreign Application Priority Data
Apr. 29, 2014    (CN) .......................... 2014 1 0179378

(51) Int. Cl.
*H02H 7/00* (2006.01)
*H02H 7/20* (2006.01)
(Continued)

(52) U.S. Cl.
CPC ................ *H02H 7/20* (2013.01); *H02H 3/04* (2013.01); *H02H 3/52* (2013.01); *H02H 7/042* (2013.01);
(Continued)

(58) Field of Classification Search
CPC ....................................................... H02H 7/20
See application file for complete search history.

(56) References Cited

U.S. PATENT DOCUMENTS

| | | | | |
|---|---|---|---|---|
| 8,390,287 B2* | 3/2013 | Crozier | ............ | G01R 33/34046 324/309 |
| 9,413,270 B2* | 8/2016 | Liu | ......................... | H02M 1/40 |

FOREIGN PATENT DOCUMENTS

| | | |
|---|---|---|
| CN | 103107523 | 5/2013 |
| CN | 104113045 | 10/2014 |
| RU | 2007006 | 1/1994 |

OTHER PUBLICATIONS

International Search Report filed in PCT/CN2015/070315 dated Apr. 3, 2015.

* cited by examiner

*Primary Examiner* — Stephen W Jackson
(74) *Attorney, Agent, or Firm* — Rankin, Hill & Clark LLP (57) ABSTRACT

A relay protection method against LC parallel circuit detuning faults comprises the steps of: a relay protection device samples a current of a parallel LC, that is, a reactor and a capacitor, and samples a total current flowing through the whole LC; convert the current of the reactor into a current of an equivalent capacitor; calculate amplitudes of the (Continued)

current of the equivalent capacitor and a current of a realistic capacitor and calculate an amplitude of the total current flowing through the LC; calculate a current amplitude ratio of the equivalent capacitor to the realistic capacitor; and when the amplitude of the total current flowing through the LC is large enough, send an alarm signal or a trip after a setting time delay if the current ratio exceeds a preset upper and lower limit range. Also provided is a corresponding relay protection device.

12 Claims, 3 Drawing Sheets

(51) Int. Cl.
  *H02H 7/04* (2006.01)
  *H02H 7/16* (2006.01)
  *H02H 3/04* (2006.01)
  *H02H 3/52* (2006.01)
  *H02H 7/06* (2006.01)
  *H02H 7/26* (2006.01)
  *H02J 1/02* (2006.01)
  *H02J 3/24* (2006.01)
  *H02J 3/36* (2006.01)
  *H02J 3/01* (2006.01)
(52) U.S. Cl.
  CPC ............... *H02H 7/06* (2013.01); *H02H 7/16* (2013.01); *H02H 7/267* (2013.01); *H02H 7/268* (2013.01); *H02J 1/02* (2013.01); *H02J 3/24* (2013.01); *H02J 3/36* (2013.01); *H02J 3/01* (2013.01); *H02J 2003/365* (2013.01); *Y02E 40/40* (2013.01); *Y02E 60/60* (2013.01)

Fig. 6

RELAY PROTECTION METHOD AND APPARATUS AGAINST LC PARALLEL CIRCUIT DETUNING FAULTS

FIELD OF THE INVENTION

The present invention belongs to the field of power systems, and particularly, to a relay protection method and apparatus against LC parallel circuit detuning faults.

BACKGROUND OF THE INVENTION

A high voltage direct current (DC) power transmission system generates massive harmonic waves in a DC system and an alternating current (AC) system connected therewith, and in order to inhibit output of the harmonic waves at the DC side of a converter, a high voltage passive type DC filter is mounted at the DC side. A common passive filter comprises a mono-tuning filter, a dual-tuning filter, a tri-tuning and a high pass filter. In dual-tuning and tri-tuning circuits, there is a parallel LC (reactor and capacitor) circuit. The protection of the existing dual-tuning and tri-tuning filters is mainly unbalance protection of the capacitor, differential protection of the filters, unbalance protection of two groups of filters having same parameters, impedance protection and voltage ratio protection, and there is no detuning protection method special for the LC parallel circuit detuning therein. Related content may refer to *Detection Method Research on Detuning Fault Elements of High Voltage/Ultrahigh High Voltage Tri-Tuning DC Filters* (Huihui LUO, South China University of Technology, Master's Thesis, 2011) and *DC Filter Protection in Ultrahigh Voltage DC Systems* (Jifeng WEN, Power System Automation, Volume 28, Journal 21, Pages 69-72, 2004).

In addition, in respect to a long-distance power transmission mode where a serial capacitance compensator and the like are arranged in a power transmission line, when parameters are inappropriate, a subsynchronous oscillation phenomenon may occur, and the steam turbine-generator shaft may be damaged in serious cases, leading to torsion of the shaft. In order to inhibit the subsynchronous oscillation, one of main methods is to mount blocking filters at the high voltage side of the unit transformer, and the LC parallel circuits are mounted therein. An LC detuning protection method of the blocking filter is mainly the unbalance protection of the capacitor and the out-of-limit protection of an LC current ratio, with respect to a LC current out-of-limit protection method, patent 201310032991.7 discloses a technical solution, but this method, in order to avoid system disturbance or protection maloperation during oscillation, has to expand the upper and lower limit range of a current ratio as well as prolong a protection delay constant value, and these measures reduce the protection sensitivity and cannot provide fast protection.

SUMMARY OF THE INVENTION

An objective of the present invention is to provide an improved method and apparatus against LC parallel circuit detuning faults, which retain the characteristics of simple wiring and reliability of the original method, and also improve the stability of calculation results of a current ratio and raise sensitivity and rapidity of protection.

In order to achieve the objective, the present invention adopts the technical solution:

a relay protection method against LC parallel circuit detuning faults comprises the following steps:

(1) sampling, by a relay protection device, a current of a parallel LC (a reactor and a capacitor), and sampling a total current flowing through the whole LC;

(2) converting the current of the reactor into a current of an equivalent capacitor;

(3) calculating amplitudes of the current of the equivalent capacitor and a current of a realistic capacitor and calculating an amplitude of the current flowing through the LC;

(4) calculating a current amplitude ratio of the equivalent capacitor to the realistic capacitor; and (5) when the amplitude of the total current flowing through the LC is large enough, sending an alarm signal or a trip with outputting normal open contact after a setting time-delay if the current ratio exceeds a preset upper and lower limit range.

Further, the step (2) specifically comprises: converting the current of the reactor into a current of an equivalent capacitor by differentiation, wherein the formula adopted is:

$$i_{Ceq}(n) = \frac{n_{CT,L}}{n_{CT,C}} \left[ LC \frac{i_L(n) - 2i_L(n-1) + i_L(n-2)}{T_s^2} + RC \frac{i_L(n) - i_L(n-1)}{T_s} \right] \quad \text{Formula 1}$$

wherein, $i_L$ is the current of the reactor, $i_{Ceq}$ is the current of the equivalent capacitor, $n_{CT,L}$ and $n_{CT,C}$ are a current conversion ratio of current transformers (CT) of a reactor subcircuit and a capacitor subcircuit in the parallel LC circuit respectively, L is an inductance value of the reactor, R is an equivalent resistance value of the reactor subcircuit (R is very small usually and can be neglected), C is a capacitance value of the capacitor and $T_s$ is a sampling time interval, and n is a serial number of a discrete current signal.

Further, the step (3) specifically comprises: only calculating current amplitudes of working frequency fundamental waves regarding the LC parallel circuit detuning protection of blocking filters, a sampling frequency $f_s$ being usually a value ranging from 1200 Hz-2400 Hz; and calculating the current amplitudes of 12-order, 24-order and 36-order harmonics waves regarding the LC parallel circuit detuning protection for dual-tuning and tri-tuning DC filters, a higher sampling frequency $f_s$ being required and being usually a value ranging from 4800 Hz-10 kHz, $T_s$ being equal to $1/f_s$.

Further, the method calculating the current amplitudes of the working frequency fundamental waves is a full cycle wave, short data window Fourier value algorithm, or a sine wave peak value detection algorithm adopting narrow band pass filtering.

Further, the step (5) specifically comprises: when the amplitude of the total current flowing through the LC is large enough, sending an alarm signal or a trip signal by delay and outputting an idle contact of a trip delay if the current ratio exceeds a preset upper and lower limit range, wherein an upper limit constant value $\text{Ratio}_{set.max}$ of the current ratio is $\text{Ratio}_{nrml}+(2\%\sim10\%)\text{Ratio}_{nrml}$, a lower limit constant value $\text{Ratio}_{set.min}$ of the current ratio is $\text{Ratio}_{nrml}-(2\%\sim10\%)\text{Ratio}_{nrml}$, in which $\text{Ratio}_{nrml}$ is a current ratio in a normal case and $\text{Ratio}_{nrml}=1.0$ theoretically.

Further, the setting time-delay value range is 0-60 s; and a fast protection delay default range is 0.1-5 s.

The invention further provides a relay protection device against LC parallel circuit detuning faults, characterized by comprising a sampling module, a converting module, a calculating module and a judging and activating module, wherein:

the sampling module is configured to sample, by a relay protection device, a current of a parallel LC (a reactor and a capacitor), and sample a total current flowing through the whole LC;

the converting module is configured to convert the current of the reactor obtained by the sampling module into a current of an equivalent capacitor; the calculating module is configured to calculate amplitudes of the current of the equivalent capacitor and a current of a realistic capacitor according to results of the sampling module and the converting module and calculate an amplitude of the current flowing through the LC, as well as calculate a current amplitude ratio of the equivalent capacitor to the realistic capacitor; and the judging and activating module is configured to, when the amplitude of the total current flowing through the LC is large enough, send, according to a result of the calculating module, an alarm signal or a trip signal by delay and output an idle contact of a trip delay if the current ratio exceeds a preset upper and lower limit range.

Further, the converting module converts the current of the reactor into a current of an equivalent capacitor by differentiation, wherein the adopted formula for converting is:

$$i_{Ceq}(n) = \frac{n_{CT,L}}{n_{CT,C}} \left[ LC \frac{i_L(n) - 2i_L(n-1) + i_L(n-2)}{T_s^2} + RC \frac{i_L(n) - i_L(n-1)}{T_s} \right] \quad \text{Formula 1}$$

wherein, $i_L$ is the current of the reactor, $i_{Ceq}$ is the current of the equivalent capacitor, $n_{CT,L}$ and $n_{CT,C}$ are a current conversion ratio of current transformers of a reactor subcircuit and a capacitor subcircuit in the parallel LC circuit respectively, L is an inductance value of the reactor, R is an equivalent resistance value of the reactor subcircuit (R is very small usually and can be neglected), C is a capacitance value of the capacitor and $T_s$ is a sampling time interval, and n is a serial number of a discrete current signal.

Further, the calculating module calculating an amplitude of the current flowing through the LC specifically comprises: only calculating current amplitudes of working frequency fundamental waves regarding the LC parallel circuit detuning protection of blocking filters, a sampling frequency $f_s$ being usually a value ranging from 1200 Hz-2400 Hz; and calculating the current amplitudes of 12-order, 24-order and 36-order harmonics waves regarding the LC parallel circuit detuning protection for dual-tuning and tri-tuning DC filters, a higher sampling frequency $f_s$ being required and being usually a value ranging from 4800 Hz-10 kHz, $T_s$ being equal to $1/f_s$.

Further, the method calculating the current amplitudes of the working frequency fundamental waves is a full cycle wave, short data window Fourier value algorithm, or a sine wave peak value detection algorithm adopting narrow band pass filtering.

Further, the judging and activating module is configured to, when the amplitude of the total current flowing through the LC is large enough, send an alarm signal or a trip signal by delay and output an idle contact of a trip delay if the current ratio exceeds a preset upper and lower limit range, wherein an upper limit constant value $Ratio_{set.max}$ of the current ratio is $Ratio_{nrml}+(2\%\sim10\%)Ratio_{nrml}$, a lower limit constant value $Ratio_{set.min}$ of the current ratio is $Ratio_{nrml}-(2\%\sim10\%)Ratio_{nrml}$, in which $Ratio_{nrml}$ is a current ratio in a normal case and $Ratio_{nrml}=1.0$ theoretically.

Further, the setting time-delay value range is 0.5-5 s.

After the solution is adopted, the invention adopts a differential calculating method to convert the current of the reactor into the current of the equivalent capacitor, then calculates a ratio of the amplitudes of the current, thereby retaining the characteristics of simple wiring and reliability of the original detuning protection, current out-of-limit protection method, and also improving the stability of calculation results of a current ratio and raising sensitivity and rapidity of protection.

BRIEF DESCRIPTION OF THE DRAWINGS

FIG. 2 shows a tri-tuning DC filter of a high voltage DC power transmission system; in FIG. 2, a reactor L2 and a capacitor C2 constitute a parallel circuit, and in FIG. 2, a reactor L3 and a capacitor C3 constitute a parallel circuit;

DETAILED DESCRIPTION OF THE INVENTION

The technical solution of the present invention is explained in detail in combination with drawings and specific embodiments.

An embodiment of the present invention provides a relay protection method against LC parallel circuit detuning faults, comprising the following steps:

(1) sampling, by a relay protection device, a current of a parallel reactor to obtain a current $i_L$, sampling a current of a parallel capacitor to obtain a current $i_C$, and sampling a total current flowing through the LC parallel circuit to obtain a current $i_{LC}$;

(2) converting the current $i_L$ into a current $i_{Ceq}$ of an equivalent capacitor by differentiation (or differential calculus);

(3) calculating amplitudes $I_{Ceq}$, $I_C$ and $I_{LC}$ of the currents $i_{Ceq}$, $i_C$ and $i_{LC}$ by a full cycle wave short data window Fourier value algorithm, or a sine wave peak value detection algorithm adopting narrow band pass filtering;

(4) calculating a ratio of $I_{Ceq}$ to $I_C$; and (5) when the amplitude $I_{LC}$ of the current flowing through the LC is large enough, sending an alarm signal or a trip signal by delay and outputting an idle contact of a trip delay if the current ratio exceeds a preset upper and lower limit range.

The present invention provides the improved method based on the prior art, but the application occasions of the present method are not limited to the blocking filter, and can be applied to the relay protection of LC parallel circuits such as a dual-tuning DC filter and a tri-tuning DC filter of a DC power transmission system.

Figure 3:
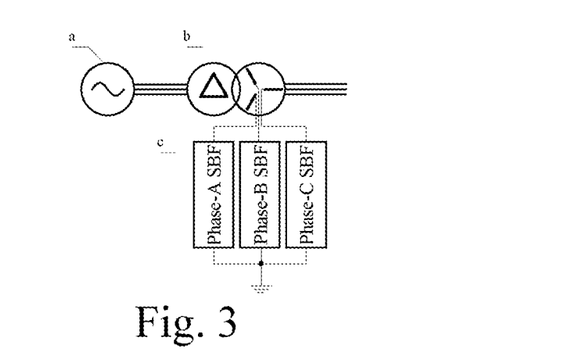
FIG. 3 shows a circuit schematic diagram of a generator, an unit transformer and blocking filters.

The following embodiment is taken for explaining: a 600 MW power generation set has a rated power 600 MW, a rated voltage 22 kV and a rated power factor 0.9; and a main transformer has a rated capacity 750 MVA, a rated voltage ratio 500 kV/22 kV, a Yd-11 wiring manner and a short circuit impedance 13.5%. As shown in FIG. 3, a is a generator, b is the unit transformer, c is an phase-A blocking filter, and circuits of phase-B and phase-C blocking filters are the same the circuit of the phase-A blocking filter.

Figure 4:
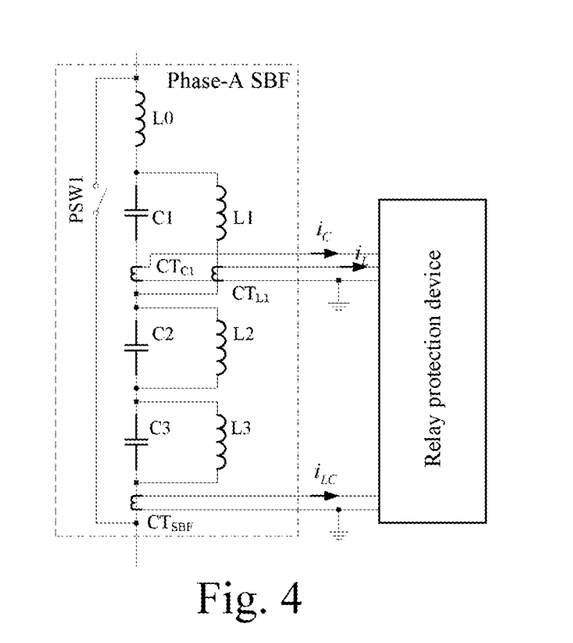
FIG. 4 is a wiring schematic diagram of an internal circuit of phase-A blocking filters and current transformers.

The neutral point at the high voltage side of the unit transformer is opened and is serially connected to three phase static blocking filter (SBF) and is then grounded, wherein the SBF consists of an inductor and a capacitor in serial and parallel connection. A circuit topological diagram is as shown in FIG. 4, in which:

PSW1 is a subcircuit switch, L0 is a 0 order reactor, C1 and L1 are a first group of reactor and capacitor connected in parallel, C2 and L2 are a second group of reactor and capacitor connected in parallel, C3 and L3 are a third group of reactor and capacitor connected in parallel, $CT_{C1}$ is a current transformer of C1, $CT_{L1}$ is a current transformer of L1, and $CT_{LC}$ is a current transformer of the whole blocking filter. The current transformers of C2, L2, C3 and L3 are omitted in the drawing and are not shown.

Figure 1:
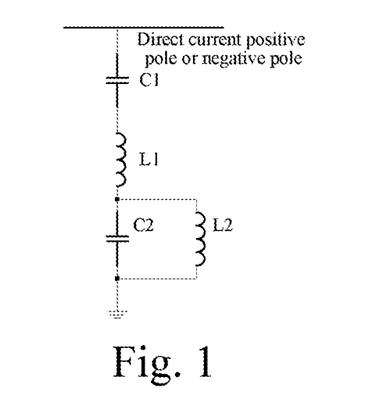
FIG. 1 shows a dual-tuning DC filter of a high voltage DC power transmission system.
Figure 2:
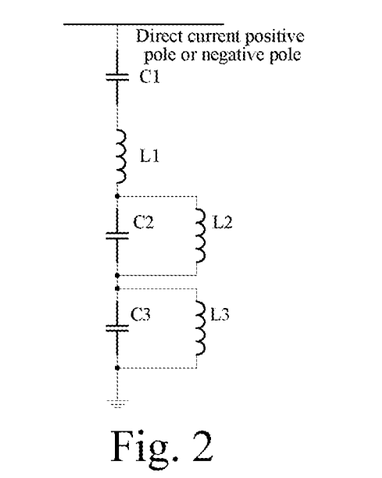

Basic parameters of the SBF are as follows:

The impedance of L0 is $Z_{L0}$=28.25Ω the impedance of the first group of parallel reactor L1 is $Z_{L1}$=9.457Ω, the capacitive reactance of the first group of parallel capacitor C1 is $X_{C1}$=5.272Ω, the impedance of the second group of parallel reactor L2 is $Z_{L2}$=39.578Ω, the capacitive reactance of the second group of parallel capacitor C2 is $X_{C2}$=91326Ω, the impedance of the third group of parallel reactor L3 is $Z_{L3}$=20.054Ω, the capacitive reactance of the third group of parallel capacitor C3 is $X_{C3}$=3.368Ω, a current conversion ratio of the current transformer $CT_{L1}$ is $n_{CT,L1}$=1200 A/5 A, a current conversion ratio of the current transformer $CT_{C1}$ is $n_{CT,C1}$=2500 A/5 A, and a current conversion ratio of the current transformer is $n_{CT,SBF}$=1000 A/5 A. The first group of parallel reactor and capacitor in FIG. 2 is taken as an example for explaining a specific implementing method of detuning fault protection. The implementing methods of detuning protection of the second and third groups of parallel reactors and capacitors are the same as that of the first group of parallel reactor and capacitor, and the implementing methods of detuning protection of phase-B and phase-C are same as that of detuning protection of the phase-A.

The detuning protection of the phase-A first group of parallel reactor and capacitor comprises the specific implementing steps:

(1) step 1, sampling, by a relay protection device, a current of the first group of parallel reactor to obtain a current $i_L$, sampling a current of a parallel capacitor to obtain a current $i_C$, and sampling a total current flowing through the LC parallel circuit to obtain $i_{LC}$, wherein a default sampling frequency is $f_s$=1200 Hz, the relay protection device is only connected to a current, and wiring is simple; current amplitudes of working frequency fundamental waves are only calculated regarding the LC detuning protection of blocking filters, and a sampling frequency $f_s$ is usually a value ranging from 1200 Hz-2400 Hz; and in order to calculate the current amplitudes of 12-order, 24-order and 36-order harmonics waves regarding the detuning protection for dual-tuning and tri-tuning DC filters, and the sampling frequency $f_s$ needs to be higher and is usually a value ranging from 4800 Hz-10 kHz.

(2) step 2, converting the current $i_L$ into a current $i_{Ceq}$ of an equivalent capacitor by differentiation (or differential calculus), wherein the formula adopted is:

$$i_{Ceq}(n) = \frac{n_{CT,L}}{n_{CT,C}} \left[ LC \frac{i_L(n) - 2i_L(n-1) + i_L(n-2)}{T_s^2} + RC \frac{i_L(n) - i_L(n-1)}{T_s} \right] \quad \text{Formula 1}$$

wherein, $n_{CT,L}$ and $n_{CT,C}$ are a current conversion ratio of current transformers (CT) of a reactor subcircuit and a capacitor subcircuit in the parallel LC circuit respectively, L is an inductance value of the reactor, R is an equivalent resistance value of the reactor subcircuit (R is very small usually and can be neglected), C is a capacitance value of the capacitor and $T_s$ is a sampling time interval, and n is a serial number of a discrete current signal. $T_s$=1/$f_s$. In this example, $$L = \frac{Z_{L1}}{2\pi \times 50 \text{ Hz}} = \frac{9.457\Omega}{2\pi \times 50 \text{ Hz}} = 0.03010H$$

$$C = \frac{1}{2\pi \times 50 \text{ Hz} \times X_{C1}} = \frac{1}{2\pi \times 50 \text{ Hz} \times 5.272} = 6.038 \times 10^{-4} F$$

$$R = 0\Omega$$

$$T_s = 1/f_s = 1/(1200 \text{ Hz})$$

$$n_{CT,L} = n_{CT,L1} = 1200/5$$

$$n_{CT,C} = n_{CT,C1} = 2500/5$$

(3) step 3, calculating amplitudes $I_{Ceq}$, $I_C$ and $I_{LC}$ of the currents $i_{Ceq}$, $i_C$ and $i_{LC}$ by a full cycle wave short data window Fourier value algorithm, or a sine wave peak value detection algorithm adopting narrow band pass filtering, wherein in this embodiment, the full cycle wave Fourier value algorithm is adopted and the formula is as follows:

$$\begin{cases} I_m(n) = \sqrt{a_m^2(n) + b_m^2(n)} \\ a_m(n) = \frac{2}{N} \left[ \sum_{k=0}^{N-1} i_m(k) \cos\left(k \cdot \frac{2\pi}{N} \cdot P\right) \right] \\ b_m(n) = \frac{2}{N} \left[ \sum_{k=0}^{N-1} i_m(k) \sin\left(k \cdot \frac{2\pi}{N} \cdot P\right) \right] \end{cases} \quad m = Ceq, C, LC$$

wherein, the subscript m=Ceq,C,LC denotes "equivalent capacitor", "capacitor", and "parallel LC"; $I_{Ceq}$, $I_C$ and $I_{LC}$ respectively denote amplitudes of the current $i_{Ceq}$ of the equivalent capacitor, current $i_C$ of the capacitor and the current/LC flowing through the LC parallel circuit; N is a data window length in Fourier filtering calculation, and a default value is N=24; and P is a harmonic order; regarding the LC detuning protection of the blocking filters, P=1 and fundamental waves are only taken for calculating; and regarding the LC detuning protection for dual-tuning and tri-tuning DC filters, P is equal to 12, 24 or 36 according to the working requirements of the filters, that is, the amplitudes of 12-order, 24-order and 36-order subharmonic currents are calculated. In this example, N=24.

(4) step 4, calculating a current ratio sequence of $I_{Ceq}$ to $I_C$ by adopting the following formula:

$$\text{Ratio}(n) = \frac{I_{Ceq}(n)}{\max\{I_C(n), \varepsilon\}} \quad \text{formula 3}$$

wherein, ε is a small threshold set by a program in the relay protection device and a divider is prevented from being 0. A value range of ε is 0.5-2% of a rated second amplitude of the capacitor current transformer, and in a default case, the amplitude 1% is a default value of ε. For example, a second effective value of the current transformer $CT_{C1}$ is 5 A, and 1% of the amplitude, i.e., 0.0707 A, corresponding to 5 A can be used as the default value of ε.

(5) step 5, adopting a following criterion regarding the first group of parallel LC detuning protection:

$$I_{LC}(n) > I_{set} \text{ and } [\text{Ratio}(n) > \text{Ratio}_{set,max} \text{ or Ratio}(n) < \text{Ratio}_{set,min}] \quad \text{Formula 4}$$

wherein, $I_{set}$ is a current open constant value, $\text{Ratio}_{set,max}$ is an upper limit of a current ratio protection constant value, and Ratio$_{set.min}$ is a lower limit of a current ratio protection constant value. A constant value setting method is as follows:

(a) the amplitude of the current flowing through LC is calculated in a rated operation working condition to obtain $I_{LC,rated}$ and a set protection constant value of 10-40% of the amplitude is taken, wherein for this example, when the motor operates in a rated condition, the current flowing through the blocking filter is:

$$I_{rated} = \left(\frac{600 \text{ MW}}{\sqrt{3} \cdot 500 \text{ kV} \cdot 0.9}\right) \cdot \left(\frac{5 \text{ A}}{1000 \text{ A}}\right) = 3.849 \text{ A}$$

and for example, 20% is taken for setting, a calculation result is:

$$I_{set} = 20\% \times 3.849 \text{ A} = 0.770 \text{ A}$$

(b) a current ratio of $I_{Ceq}$ to $I_C$ is Ratio$_{nrml}$=1.0, a ratio p % is taken, and a value of p is 2-10, the Ratio$_{set.min}$ is set by reducing Ratio$_{nrml}$ by p %, and Ratio$_{set.max}$ is set by increasing Ratio$_{nrml}$ by p %.

Figure 5:
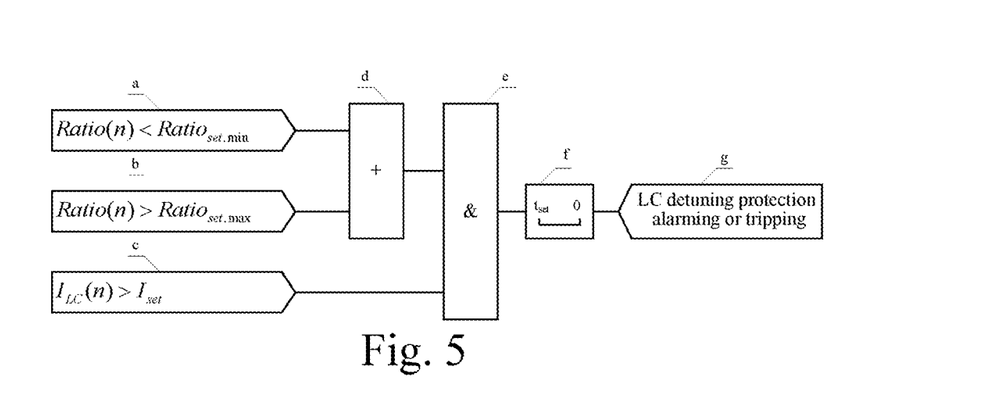
FIG. 5 is a protection logic diagram of an embodiment of the present invention.

For example, when p=5, a calculation result is $$\text{Ratio}_{set.min} = \text{Ratio}_{nrml}(1-p\%) = 1.0 \times (1-5\%) = 0.95$$

$$\text{Ratio}_{set.max} = \text{Ratio}_{nrml}(1+p\%) = 1.0 \times (1+5\%) = 1.05$$

in the protection criterion, referring to FIG. 5, wherein, h, i. A current ratio criterion logic element in formula 4 outputs 1 when the condition is met otherwise outputs 0.

j. The current criterion logic element in formula 4 outputs 1 when the condition is met otherwise outputs 0.

d. "Or" gate logic operation.

e. "And" gate logic operation.

f. Constant time lag delay logic, a timer begins counting when an input changes from 0 to 1, delays to reach a tj moment and logically outputs 1, and outputs 0 when the input remains unchanged or changes from 1 to 0.

g. outputting a protection alarm or trip result.

When the condition in formula 4 is met, timing begins, when timing exceeds the setting time delay value $t_{set}$, the relay protection device sends a corresponding alarm signal or trip; if the protection criterion is not met, the timer is returned back to 0. The setting time delay value is set according to an influence of various external faults or grid oscillation, and the setting time delay value $t_{set}$ can be a value between 0.1-5 s.

The above method realizes detuning protection of the phase-A first group of blocking filters, and is the same as the implementing method of the detuning protection of the phase-A second and third groups of parallel reactors and capacitors. The implementing methods of the phase-B and phase-C detuning protection are the same as that of the detuning protection of the phase-A. The implementing method of the detuning protection of the LC parallel circuit in the dual-tuning and tri-tuning DC filters is also the same, only a higher sampling frequency is required to calculate a higher-order harmonic current, which is not repeated here.

In a case of a fault in or out of the LC, a conventional current ratio calculation result has obvious fluctuation. For example the fault in the LC (turn-to-turn short circuit fault of the reactor or short circuit fault of the capacitor), then after the fault, the current of the reactor and the current of the capacitor both have sub synchronous current components, which lead to the fluctuation of a current ratio calculation result, and it possibly causes that the LC detuning protection is started and then returned, and the protection action is delayed. In order to eliminate such influence, a protection constant value can be changed, the upper limit constant value of the current ratio is improved, the lower limit constant value of the current ratio is reduced, but as a result, the protection sensitivity is reduced and slight internal faults cannot be reflected.

For another example, for the external LC fault disturbance, a grounding fault occurs on a grid power transmission line, re-switching on is successful after the fault is removed, in this process, the current of the reactor and the current of the capacitor both have great change, the subsynchronous oscillation current components are laminated, the current ratio calculation result is fluctuated for long term (lasting for 5-10 s), and especially, in the initial stage of the external fault, the current ratio calculation result is fluctuated very dramatically. In order to avoid the influence of the external fault, the protection delay constant value has to be prolonged, which delays the protection action.

After the method of the present invention is adopted, although the current during the internal and external faults changes, particularly, the subsynchronous oscillation currents are laminated, but the waveforms of the current of the reactor and the current of the equivalent capacitor are consistent, which makes the change degrees of the amplitude of the current of the reactor and the amplitude of the current of the equivalent capacitor consistent, therefore the current ratio result is very stable. For example, for the large external fault disturbance such as grounding fault on the grid power transmission line, the current ratio can be stable within 0.3-0.5 s. Therefore, the invention has the beneficial effects: retaining the characteristics of simple wiring and reliability of the original detuning protection method, i.e., the current ratio out-of-limit protection method, and also improving stability of calculation results of a current ratio and raising sensitivity and rapidity of protection.

Figure 6:
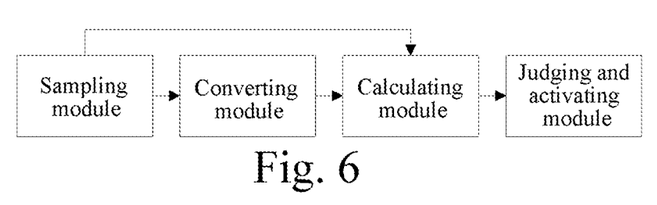
FIG. 6 is a structural diagram of an apparatus of an embodiment of the present invention.

In addition, an embodiment of the present invention further provides a relay protection device against LC parallel circuit detuning faults, as shown in FIG. 6, which comprises a sampling module, a converting module, a calculating module and a judging and activating module, wherein:

the sampling module is configured to sample, by a relay protection device, a current of a parallel LC (a reactor and a capacitor), and sample a total current flowing through the whole LC;

the converting module is configured to convert the current of the reactor obtained by the sampling module into a current of an equivalent capacitor;

the calculating module is configured to calculate amplitudes of the current of the equivalent capacitor and a current of a realistic capacitor and calculate an amplitude of the total current flowing through the LC, as well as calculate a current amplitude ratio of the equivalent capacitor to the realistic capacitor; and the judging and activating module is configured to, when the amplitude of the total current flowing through the LC is large enough, send, according to a result of the calculating module, an alarm signal or a trip after a setting time delay if the current ratio exceeds a preset upper and lower limit range.

The above embodiments are merely intended to explain a technical idea of the present invention, and do not limit a protection scope of the present invention, and any changes made based on the technical solution according to the technical idea of the present invention fall within the protection scope of the present invention.

What is claimed is:

1. A relay protection method against LC parallel circuit detuning faults, comprising:
   (1) sampling, by a relay protection device, a current of a parallel reactor, sampling a current of a parallel capacitor, and sampling a total current flowing through the LC parallel circuit;
   (2) converting the current of the reactor into a current of an equivalent capacitor;
   (3) calculating amplitudes of the current of the equivalent capacitor and a current of a realistic capacitor and calculating an amplitude of the current flowing through the LC parallel circuit;
   (4) calculating a current amplitude ratio of the equivalent capacitor to the realistic capacitor; and
   (5) when the amplitude of the total current flowing through the LC parallel circuit is large enough, sending an alarm signal or a trip after a setting time delay if the current amplitude ratio exceeds a preset upper and lower limit range.

2. The relay protection method against LC parallel circuit detuning faults according to claim 1, wherein the step (2) further comprises: converting the current of the reactor into the current of an equivalent capacitor by differentiation, wherein the formula adopted is:

$$i_{Ceq}(n) = \frac{n_{CT,L}}{n_{CT,C}} \left[ LC \frac{i_L(n) - 2i_L(n-1) + i_L(n-2)}{T_s^2} + RC \frac{i_L(n) - i_L(n-1)}{T_s} \right]$$

wherein, $i_L$ is the current of the reactor, $i_{Ceq}$ is the current of the equivalent capacitor, $n_{CT,L}$ and $n_{CT,C}$ are a current conversion ratio of current transformers of a reactor subcircuit and a capacitor subcircuit in the LC parallel circuit respectively, L is an inductance value of the reactor, R is an equivalent resistance value of the reactor subcircuit, C is a capacitance value of the capacitor and $T_s$ is a sampling time interval, and n is a serial number of a discrete current signal.

3. The relay protection method against LC parallel circuit detuning faults according to claim 2, wherein the step (3) further comprises: only calculating current amplitudes of working frequency fundamental waves regarding the LC parallel circuit detuning protection of blocking filters, a sampling frequency $f_s$ being a value ranging from 1200 Hz-2400 Hz; and calculating the current amplitudes of 12-order, 24-order and 36-order harmonics waves regarding the LC parallel circuit detuning protection for dual-tuning and tri-tuning DC filters, a higher sampling frequency $f_s$ being a value ranging from 4800 Hz-10 kHz, $T_s$ being equal to $1/f_s$.

4. The relay protection method against LC parallel circuit detuning faults according to claim 3, wherein calculating the current amplitudes of the working frequency fundamental waves is a full cycle wave, short data window Fourier value algorithm, or a sine wave peak value detection algorithm adopting narrow band pass filtering.

5. The relay protection method against LC parallel circuit detuning faults according to claim 1, wherein the step (5) further comprises: when the amplitude of the total current flowing through the LC parallel circuit is large enough, sending the alarm signal or the trip signal by delay and outputting an idle contact of a trip delay if the current amplitude ratio exceeds the preset upper and lower limit range, wherein an upper limit constant value $Ratio_{set.max}$ of the current amplitude ratio is $Ratio_{nrml}+(2\%\sim10\%)Ratio_{nrml}$, a lower limit constant value $Ratio_{set.min}$ of the current amplitude ratio is $Ratio_{nrml}-(2\%\sim10\%)Ratio_{nrml}$, in which $Ratio_{nrml}$ is a normal current ratio in a normal case and $Ratio_{nrml}=1.0$.

6. The relay protection method against LC parallel circuit detuning faults according to claim 1, wherein a setting time delay value range is 0-60 s; and a fast protection delay default range is 0.1-5 s.

7. A relay protection device against LC parallel circuit detuning faults, comprising a sampling module, a converting module, a calculating module and a judging and activating module, wherein:
   the sampling module is configured to sample, by a relay protection device, a current of a parallel reactor and a parallel capacitor, and sample a total current flowing through the whole LC parallel circuit;
   the converting module is configured to convert the current of the reactor obtained by the sampling module into a current of an equivalent capacitor;
   the calculating module is configured to calculate, according to results of the sampling module and the converting module, amplitudes of the current of the equivalent capacitor and a current of a realistic capacitor and calculate an amplitude of the total current flowing through the LC parallel circuit, as well as calculate a current amplitude ratio of the equivalent capacitor to the realistic capacitor; and
   the judging and activating module is configured to, when the amplitude of the total current flowing through the LC parallel circuit is large enough, send, according to a result of the calculating module, an alarm signal or a trip after a setting time delay if the current amplitude ratio exceeds a preset upper and lower limit range.

8. The relay protection device against LC parallel circuit detuning faults according to claim 7, wherein the converting module converts the current of the reactor into a current of the equivalent capacitor by differentiation, wherein the formula for converting is:

$$i_{Ceq}(n) = \frac{n_{CT,L}}{n_{CT,C}} \left[ LC \frac{i_L(n) - 2i_L(n-1) + i_L(n-2)}{T_s^2} + RC \frac{i_L(n) - i_L(n-1)}{T_s} \right]$$

wherein, $i_L$ is the current of the reactor, $i_{Ceq}$ is the current of the equivalent capacitor, $n_{CT,L}$ and $n_{CT,C}$ are a current conversion ratio of current transformers of a reactor subcircuit and a capacitor subcircuit in the LC parallel circuit respectively, L is an inductance value of the reactor, R is an equivalent resistance value of the reactor subcircuit, C is a capacitance value of the capacitor and $T_s$ is a sampling time interval, and n is a serial number of a discrete current signal.

9. The relay protection device against LC parallel circuit detuning faults according to claim 7, wherein the calculating module is further configured to: only calculate current amplitudes of working frequency fundamental waves regarding the LC parallel circuit detuning protection of blocking filters, a sampling frequency $f_s$ being a value ranging from 1200 Hz-2400 Hz; and calculate the current amplitudes of 12-order, 24-order and 36-order harmonics waves regarding the LC parallel circuit detuning protection for dual-tuning and tri-tuning DC filters, a higher sampling frequency $f_s$ being a value ranging from 4800 Hz-10 kHz, $T_s$ being equal to $1/f_s$.

10. The relay protection device against LC parallel circuit detuning faults according to claim 9, wherein the the calculation module is further configured to: calculate the current amplitudes of the working frequency fundamental waves as a full cycle wave, short data window Fourier value algorithm, or a sine wave peak value detection algorithm adopting narrow band pass filtering.

11. The relay protection device against LC parallel circuit detuning faults according to claim 7, wherein the judging and activating module is configured to, when the amplitude of the total current flowing through the LC parallel circuit is large enough, send the alarm signal or the trip signal by delay and output an idle contact of a trip delay if the current amplitude ratio exceeds a preset upper and lower limit range, wherein an upper limit constant value $Ratio_{set.max}$ of the current ratio is $Ratio_{nrml}+(2\%\sim10\%)Ratio_{nrml}$, a lower limit constant value $Ratio_{set.min}$ of the current amplitude ratio is $Ratio_{nrml}-(2\%\sim10\%)Ratio_{nrml}$, in which $Ratio_{nrml}$ is a normal current ratio in a normal case and $Ratio_{nrml}=1.0$.

12. The relay protection device against LC parallel circuit detuning faults according to claim 7, wherein a setting time delay value range is 0-60 s; and a fast protection delay default range is 0.1-5 s.

\* \* \* \* \*